(12) United States Patent
Boegelein

(10) Patent No.: US 6,799,858 B1
(45) Date of Patent: Oct. 5, 2004

(54) PIVOTING ACTUATOR WHICH CAN BE DISENGAGED

(75) Inventor: Josef Boegelein, Sachsen/Ansbach (DE)

(73) Assignee: Oechsler Aktiengesellschaft, Ansbach (DE)

(*) Notice: Subject to any disclaimer, the term of this patent is extended or adjusted under 35 U.S.C. 154(b) by 237 days.

(21) Appl. No.: 10/129,649
(22) PCT Filed: Oct. 24, 2000
(86) PCT No.: PCT/EP00/10453
§ 371 (c)(1),
(2), (4) Date: Jun. 11, 2002
(87) PCT Pub. No.: WO01/34988
PCT Pub. Date: May 17, 2001

(51) Int. Cl.$^7$ .............................................. G02B 7/182
(52) U.S. Cl. ..................... 359/877; 359/871; 359/872; 359/873; 359/874; 359/875; 359/876; 359/841
(58) Field of Search ................................ 359/871–877, 359/841; 248/476–477, 479, 549

(56) References Cited

U.S. PATENT DOCUMENTS

| | | | |
|---|---|---|---|
| 5,190,499 A | * 3/1993 | Mori et al. ................... 464/36 |
| 5,867,328 A | 2/1999 | Stapp et al. | |
| 6,130,514 A | * 10/2000 | Oesterholt et al. .......... 318/438 |
| 6,641,271 B1 | * 11/2003 | Churchett .................... 359/841 |

FOREIGN PATENT DOCUMENTS

| | | | |
|---|---|---|---|
| DE | 4327388 | 8/1993 | ............. B60R/1/06 |
| EP | 0652135 | 9/1994 | ............. B60R/1/06 |
| GB | 1502733 | 3/1976 | .......... H01H/21/24 |
| JP | 60185651 | 9/1985 | ............. B60R/1/06 |

* cited by examiner

Primary Examiner—Mohammad Sikder
(74) Attorney, Agent, or Firm—Horst M. Kasper

(57) ABSTRACT

In order to electrically reverse the motorized pivoting actuator 11, used for example to adjust an exterior mirror with restricted angles of movement and to return the mirror into a working position after it has been pivoted by external means (either by hand, or as a result of a collision), engagement of the coupling actuator 16 is axially detached, as a result of an external pivoting of the coupling output drive 18, against an elastic restoring force and the coupling output drive is pivoted in relation to the coupling actuator, according to the effective torque. Thus, the coupling output drive is also brought out of its restricted trajectory, in such a way that the drive motor 13 can rotate the coupling actuator 16 freely, until the coupling actuator and the coupling output drive 18 reach a relative position, which has been predetermined in the construction concept in said position, and the coupling claws 28 re-engage in the recesses of the opposing pinion 16 or 18. The motor 13 then rotates the mirror, until the coupling actuator 16 is brought out of its unrestricted orbit 30 and is returned to the trajectory 25 with restricted angles of movement and the mirror can then once again be pivoted in a motorized manner about its previous working position.

10 Claims, 1 Drawing Sheet

PIVOTING ACTUATOR WHICH CAN BE DISENGAGED

CROSS-REFERENCES TO RELATED APPLICATIONS (not applicable)

Figure 1:
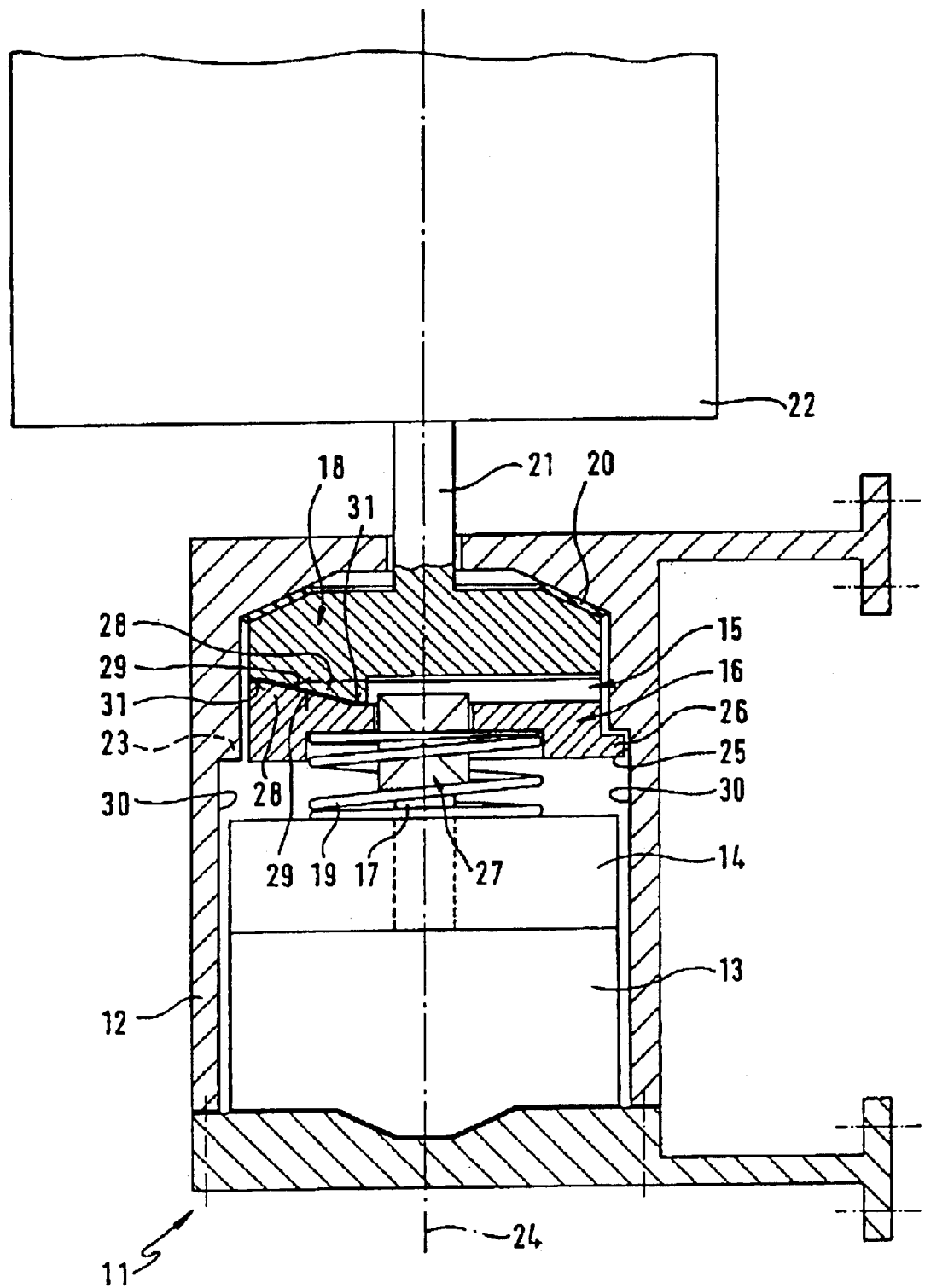

STATEMENT REGARDING FEDERALLY SPONSORED RESEARCH OR DEVELOPMENT (not applicable)

REFERENCE TO A "MICROFICHE APPENDIX" (see 37 CFR 1.96)

(not applicable)

BACKGROUND OF THE INVENTION

The present invention relates to a pivoting actuator according to the preamble of claim 1, as is known for example for electrically adjusting a vehicle wing mirror.

When external torque is exerted on the temporary, angled position preset by gear, because for instance a mirror position is to be adjusted manually or because a collision force is working against the edge region of the mirror mounting, a mechanical overload coupling acting as a ratchet between servomotor and swivel motor disengages, and the mirror remains in another angled position in which the coupling again engages. In any case, from this point a motorized swivel movement is made into a working range about this new angled position—for the previous working range the mirror must first be returned manually to the previous basic position. In practical everyday terms this can be experienced as an inconvenience, in particular if such wing mirror collisions occur more frequently with displacement of the mirror in or against the direction of travel, as for instance when maneuvering in narrow loading zones, such that focus on the work cycle by the repeated necessity to readjust the mirror is noticeably impaired.

In consideration of this the technical object of the present invention is to further develop a pivoting actuator of the generic type to the effect that an externally exerted swing can be cancelled any time by the driver inside the vehicle using a simple switch operation without the requirement of manual engagement by means of the swivel motor itself for instance with a vehicle wing mirror: and in particular also if as usual only a restricted angle range is to be preset for the motorized pivoting movement.

BRIEF SUMMARY OF THE INVENTION

According to the present invention the pivoting actuator is configured according to the characteristics cited in the main claim. According to this and with sufficiently strong external torque, such as especially as a result of a temporary mirror adjustment made either manually or caused by collision, the coupling actuator can be lifted axially by means of the threadlike rising flanks pivoted relatively to one another on the output drive side of the coupling claws from the coupling output drive until it disengages against an elastic restoring force. Meanwhile, the actuator can also be rotated by motor, though as a rule the actuator is at rest and consequently is held torsionally by the idle drive motor. When disengaged the coupling output drive connected to the mirror can then rotate freely relative to the actuator from outside into any angle position. When the electromotor actuator starts up again after this, the actuator-side coupling claw opposite the braked output drive is rotated to the point where it engages in the assigned recess in the coupling output drive, and now with further rotation on the actuator side the output drive, again rigidly coupled, is entrained, thus e.g. a mirror is pivoted.

When a stop solid with the housing for restricting the working range of the motorized pivoting is located in the trajectory of the coupling actuator, then a trip cam cooperating therewith on the actuator side is shifted out of this restricted trajectory as a result of axial displacement due to the onset of external torque, so as to be able to be freely raced by the motor in an orbit parallel thereto. After the coupling claws engage the output drive is rotated as described, until the spring-loaded cam reengages in the restricted trajectory, with which the mounting was rotated in motorized fashion further into the starting position as desired, from which it is again pivoted, from now on motorized, within the angularly restricted working range.

BRIEF DESCRIPTION OF THE SEVERAL VIEWS OF THE DRAWING(S)

FIG. 1—sectional view of the pivoting actuator configured according to the present invention For a more detailed explanation of the invention and its effective further developments reference is made to the following description of a simplified preferred embodiment for solving the task according to the present invention, illustrated not to scale in the diagram and restricted to the functional essentials. The sole figure of the diagram shows a pivoting actuator configured according to the present invention with a trajectory restricted to just 180° of its rotating movement, illustrated in longitudinal axial section.

DETAILED DESCRIPTION OF THE INVENTION

The illustrated pivoting actuator 11 for a swivel element 22 to be moved by motor, such as a mirror for instance, a warning signal, an inscription medium or similar accommodates in a housing 12 a high-speed drive motor 13 with a reducing gear unit 14 directly mounted in this embodiment. To reverse the direction of pivot the motor 13 is reversible and/or the gear 14 can be reversed. In a catch coupling 15 connected downstream of the gear 14 its coupling actuator 16 is connected torsionally to the gear output shaft 17, whereas its coupling output drive 18 is supported rotatably by a spring 19 by way of a braking surface 20 against the interior of the housing 12 under friction. Connected torsionally to the output drive 18 is a pivot shaft 21 bearing the swivel element 22. With coupling pinions 16–18 engaged positively in one another, it pivots with respect to the direction of pivoting and if necessary the pivoting speed according to the electrical excitation of the drive motor 13–14.

The angle of pivot of the pivot shaft 21 is usually limited to a fraction only of a complete revolution, which is why a stop 23 solid with the housing of corresponding arc length projects radially to the axis 24 into the trajectory 25 coaxial to the actuator axis 24 of a cam 26 jutting radially out from the axis 24 on the coupling actuator 16. The motor 13 is also configured without the risk of overheating by the cam 26 bearing against the stop 23 so that it can be operated when braked to a standstill. Instead of or in addition to this provision can be made for instance for a current sensor circuit on the control-side to interrupt further current supply during mechanical braking to a standstill on the stop 23. In any case, the pivot angle of the element 22 is restricted to the limited trajectory 25 in the construction concept of the coupling trip cam 26.

Whenever torque acts externally on the shaft 21 on the output side, in particular due to a collision or because the element 22 is to be adjusted manually, the system accordingly cannot be pivoted about its axis 24, since the positive locking 27 from the (still) engaged coupling 15 to the motor 13 acts as a rigid moment bearing owing to its strongly reducing gear 14. In the case of sufficiently strong external torque, however, both pinions 16/18 of the coupling 15 rotate against one another, because their claws 28—28 engaged in one another are interlocked not at a steep angle (parallel to axis), but threadlike in the opposite direction via leading ramps 29 rising in both directions of rotation about the axis 24. This reciprocal flank run-up continues until each claw 28 is lifted axially out of the hollow in the opposite pinion 16 or 18 and the claw tips 31 are thus supported rotatably axially about the axis 24 against each opposite pinion 16 or 18. Contrary to the simplified diagram actually a plurality of peripherally offset ramp claws 28 and hollows assigned opposite on the pinions 16,18 is designed for tilt-free support, and distributed such (offset against one another radially or peripherally) that simultaneous engagement of all claws in a single relative position between both pinions 16,18 which has been predetermined in the construction concept is possible.

As a result of elastic axial support of the externally rotated coupling output drive 18 against the housing 12 with contrasting rotary support of the coupling actuator 16 axially displaceable along its positive locking 28 the latter is therefore lifted slightly from the coupling output drive 18 via the claw ramps 29 extending towards one another, with corresponding axial upsetting of the helical spring 19. When as a result the coupling actuators 28 are finally completely disengaged, the shaft 21 can be left in the angled position (relative to the coupling actuator 16); or the shaft 21 is rotated further with now reduced required external torque, until the claws reengage in the previous angled position of the element 22 after precisely one revolution. Then the pivot shaft 21 is again stopped relative to the motor 13, and thus the motor 13 again determines the pivoting movement of the shaft 21 within the bounds of the trajectory 25.

As long as the claws 28 keep the coupling actuator 16 still axially displaced, its trip cam 26 is lifted out of its trajectory 25 restricted by the stop 23 into an unrestricted orbit 30. When the pivot shaft 21 rotates externally out of the working position the motor 13 is accordingly no longer blocked mechanically by the stop 23, and the coupling actuator 16—relative to the coupling output drive 18 now held fast by means of the braking surfaces 20 against rotation—can be freely pivoted, until the coupling claws 28—28 reengage. In the current angled position of the shaft 21 such engagement is generally still supported axially by the ribbed circular stop 23. The cam 26 is therefore further rotated by the drive motor 13–14 first under the pressure of the spring 19—by entraining the output drive 18 and its shaft 21—supported axially against the arc-shaped stop 23, until the cam 26 at the end of the are falls back from the stop 23 axially into the plane of the restricted trajectory 25 between the peripheral front ends of the stop 23 and lets the claws 29 fully engage axially. Now the external horizontal swing of the element 22 is again cancelled, and its motorized horizontal swing begins again from this point within the pivot angle which has been predetermined in the construction concept by the stop 23 in the trajectory 25 of the cam 26.

The entire pivoting actuator 11, namely its housing 12 including its moving parts (including the motor 13), can be manufactured cost-effectively and reliably in functional terms by plastic injection molding. Advantageously, though, a conical, therefore somewhat truncated hollow cone friction ring with frictional properties optimized to the rotating braking surface 20 is placed torsionally in the housing 12 in front of the coupling output drive 18.

In order to electrically reverse the motorized pivoting actuator 11, used for example to adjust an exterior mirror with restricted angles of movement and to return the mirror into a working position after it has been pivoted by external means (either by hand, or as a result of a collision), engagement of the coupling actuator 16 is axially detached, as a result of an external pivoting of the coupling output drive 18, against an elastic restoring force and the coupling output drive is pivoted in relation to the coupling actuator, according to the effective torque. Thus, the coupling output drive is also brought out of its restricted trajectory, in such a way that the drive motor 13 can rotate the coupling actuator 16 freely, until the coupling actuator and the coupling output drive 18 reach a relative position, which has been predetermined in the construction concept in said position, and the coupling claws 28 re-engage in the recesses of the opposing pinion 16 or 18. The motor 13 then rotates the mirror, until the coupling actuator 16 is brought out of its unrestricted orbit 30 and is returned to the trajectory 25 with restricted angles of movement and the mirror can then once again be pivoted in a motorized manner about its previous working position.

What is claimed is:

1. A pivoting actuator (11) with a rotating joint (15) placed between a control gear (14) and a pivot shaft (21), whose ramp-shaped engagement between coupling actuator (16) and coupling output die (18) lock together in a reciprocal pivot position which has been predetermined in the construction concept, but can be disengaged axially as a raw of output drive-side external onset of torque against the force of a reset spring (19), characterized in that the coupling actuator (16) and the coupling output drive (18) are arranged inside a housing (12) and are equipped with coupling claws (28) having threadlike lending ramps (29), of which the coupling output drive (18) torsionally equipped with the pivot shaft (21) is supported torsionally by means of the spring (19) via a truncated braking surface (20) against the inside of the housing (12) under friction.

2. A pivoting actuator as claimed in claim 1, characterized in that a compression spring (19) acting axially and supported on the housing presses the actuator (16) contrary to its disengagement against the output drive (18) of the coupling (15) and the latter against a braking surface (20).

3. A pivoting actuator as claimed in claim 2, characterized in that the coupling output drive (18) lies axially against a friction ring solid with the housing.

4. A pivoting actuator as claimed in claim 1, characterized by tapered braking surfaces (20).

5. A pivoting actuator as claimed in claim 1, characterized by a geared rotation of the coupling actuator (16) against the onset of torque by the output drive (19).

6. A pivoting actuator as claimed in claim 1, characterized by an angle-restricted trajectory (25) of the coupling actuator (16).

7. A pivoting actuator as claimed in claim 6, characterized in that the actuator (16) is displaced out of the restricted trajectory (25) into an unrestricted orbit (30) by means of the claw ramps (29) when the coupling claws (28) are disengaged.

8. A pivoting actuator as claimed in claim 7, characterized in that a stop (23) extending parallel to the orbit (30) as ribbed are component and solid with the housing is placed in the trajectory (25) of a radial cam (26) on the actuator side.

9. A pivoting actuator as claimed in claim 1, characterized in that it is equipped with an electric drive motor (13–14).

10. A pivoting actuator as claimed in claim 1, characterized in that its pivot shaft (21) is equipped with a pivoting element (22) in the form of a vehicle wing mirror.

* * * * *